(12) United States Patent
Masuda et al.

(10) Patent No.: US 9,446,357 B2
(45) Date of Patent: Sep. 20, 2016

(54) AERATION EQUIPMENT

(71) Applicant: SOLACE CO., LTD., Kagawa (JP)

(72) Inventors: Yasuhiko Masuda, Kagawa (JP);
Hiroyasu Masuda, Kagawa (JP)

(73) Assignee: SOLACE CO., LTD., Kagawa (JP)

( * ) Notice: Subject to any disclaimer, the term of this patent is extended or adjusted under 35 U.S.C. 154(b) by 0 days.

(21) Appl. No.: 14/402,149

(22) PCT Filed: May 14, 2013

(86) PCT No.: PCT/JP2013/063358
§ 371 (c)(1),
(2) Date: Nov. 19, 2014

(87) PCT Pub. No.: WO2013/175994
PCT Pub. Date: Nov. 28, 2013

(65) Prior Publication Data
US 2015/0306551 A1 Oct. 29, 2015

(30) Foreign Application Priority Data
May 21, 2012 (JP) ................. 2012-115201

(51) Int. Cl.
*B01F 3/04* (2006.01)
*C02F 3/20* (2006.01)
(Continued)

(52) U.S. Cl.
CPC ....... *B01F 3/04248* (2013.01); *B01F 3/04517* (2013.01); *B01F 5/04* (2013.01);
(Continued)

(58) Field of Classification Search
CPC ............ B01F 3/04496; B01F 3/04517; B01F 5/0403; B01F 5/0451; B01F 3/04248; B01F 5/04; B01F 5/061; B01F 15/0254; B01F 2005/0622; B01F 2005/0636; B01F 2215/0052; C02F 3/22; C02F 3/223; C02F 1/72; C02F 3/20; C02F 2103/007; C02F 2103/20; C02F 2103/32; C02F 2203/006; Y02W 10/15
USPC ..................................... 261/76, 77
See application file for complete search history.

(56) References Cited

U.S. PATENT DOCUMENTS 3,148,509 A * 9/1964 Laurie ................. B01F 3/04517
261/123
3,452,966 A * 7/1969 Smolski .............. B01F 3/04517
119/200

(Continued)

FOREIGN PATENT DOCUMENTS

JP 06041898 A 2/1994
JP 08192035 7/1996

(Continued)

OTHER PUBLICATIONS

International Search Report PCT/ISA/210 for International Application No. PCT/JP2013/063358 dated Aug. 20, 2013.

*Primary Examiner* — Charles Bushey
*Assistant Examiner* — Scott Bushey
(74) *Attorney, Agent, or Firm* — Harness, Dickey & Pierce, P.L.C.

(57) ABSTRACT

An aeration apparatus includes an injection nozzle provided at one of the open ends of a main body formed in the shape of a cylinder. When the injection nozzle is immersed in a liquid, the main body stands upright such that the injection nozzle is on a lower side, and gas is injected inside the main body from the injection nozzle to disperse the gas. The injection nozzle is disposed such that a center line of an injection port formed at the tip of the injection nozzle intersects the inner flow channel surface at a position lower than a blade member disposed in the lowest stage, and such that the angle formed between the center line and the vertical direction is not greater than 45 degrees.

4 Claims, 5 Drawing Sheets

(51) Int. Cl.
*B01F 5/06* (2006.01)
*B01F 5/04* (2006.01)
*B01F 15/02* (2006.01)
*C02F 1/72* (2006.01)
*C02F 103/00* (2006.01)
*C02F 103/20* (2006.01)
*C02F 103/32* (2006.01)

(52) U.S. Cl.
CPC .......... *B01F 5/061* (2013.01); *B01F 15/0254* (2013.01); *C02F 1/72* (2013.01); *C02F 3/20* (2013.01); *B01F 2005/0622* (2013.01); *B01F 2005/0636* (2013.01); *B01F 2215/0052* (2013.01); *C02F 2103/007* (2013.01); *C02F 2103/20* (2013.01); *C02F 2103/32* (2013.01); *C02F 2203/006* (2013.01); *Y02W 10/15* (2015.05)

(56) References Cited

U.S. PATENT DOCUMENTS

| | | | | |
|---|---|---|---|---|
| 3,969,446 | A | * | 7/1976 | Franklin, Jr. ....... B01F 3/04609 261/77 |
| 2002/0031046 | A1 | * | 3/2002 | Schneider ............ B01F 5/0451 366/181.5 |
| 2004/0046269 | A1 | * | 3/2004 | Oshima ............... B01F 3/04113 261/77 |
| 2008/0080303 | A1 | * | 4/2008 | Kojima ............... B01F 3/04517 366/160.1 |

FOREIGN PATENT DOCUMENTS

| | | |
|---|---|---|
| JP | 2007038067 A | 2/2007 |
| JP | 2007289915 A | 11/2007 |
| JP | 2008212908 A | 9/2008 |
| JP | 4907258 B2 | 3/2012 |

* cited by examiner

AERATION EQUIPMENT

CROSS REFERENCE TO RELATED APPLICATIONS

This application is the National Phase under 35 U.S.C. §371 of PCT International Application No. PCT/JP2013/063358, which has an International filing date of May 14, 2013 and which claims priority to Japanese patent application number 2012-115201 filed May 21, 2012, the entire contents of each of which are incorporated herein by reference.

TECHNICAL FIELD

The present invention relates to an aeration apparatus that disperses bubbles of air or the like in a liquid.

BACKGROUND ART

Aeration apparatuses are used in applications for, for example, preventing the unintended decomposition of liquids by increasing the dissolved oxygen content in wastewater from sewage treatment plants, wastewater treatment plants in food factories and livestock farms, and wastewater treatment facilities in other types of factories, as well as by increasing the dissolved oxygen content in liquids found in ponds, rivers, culture ponds, and the like. The gas-liquid mixing apparatus disclosed in Patent Literature 1, which was filed by the inventors of the present invention, is known as a conventional aeration apparatus. This apparatus includes a pentagonal gas-liquid mixing cylinder whose top and bottom are open, collision blades disposed in multiple stages within the gas-liquid mixing cylinder, and a gas ejection nozzle disposed at a bottom area of the gas-liquid mixing cylinder, and is configured such that gas ejected from the gas ejection nozzle swirls upward through the gas-liquid mixing cylinder while colliding with the collision blades, so the gas is broken into fine bubbles and dissolves into the liquid.

CITATION LIST

Patent Literature

Patent Literature 1: JP 4907258B

SUMMARY OF INVENTION

Technical Problem

The aforementioned gas-liquid mixing apparatus has advantages in that it is capable of breaking gas into fine bubbles without causing clogging problems by the collision blades disposed within the pentagonal gas-liquid mixing cylinder, apparatus maintenance is easy, a high oxygen dissolving efficiency can be achieved, and so on. However, there is further room for improvement in terms of more effectively producing a swirling flow within the gas-liquid mixing cylinder by ejecting gas from the gas ejection nozzle and increasing the drawing force and the agitation force on sludge and the like that has accumulated in the bottom part of the cylinder.

Accordingly, it is an object of the present invention to provide an aeration apparatus that can break gas that has been released in a liquid into fine bubbles so as to uniformly disperse the gas, and efficiently agitate the liquid.

Solution to Problem

The object of the present invention is achieved by an aeration apparatus comprising a main body that is formed in a shape of a cylinder with both ends open, and that has an inner flow channel surface with a pentagonal cross-sectional shape; blade members provided in multiple stages on the inner flow channel surface, the blade members having different orientations; and an injection nozzle provided at one of the open ends of the main body, wherein the injection nozzle is immersed in a liquid, with the main body standing upright such that the injection nozzle is on a lower side, and gas is injected inside the main body from the injection nozzle so as to disperse the gas; and the injection nozzle is disposed such that a center line of an injection port formed at a tip of the injection nozzle intersects the inner flow channel surface at a position lower than the blade member disposed in the lowest stage, and such that an angle formed between the center line and a vertical direction is not greater than 45 degrees.

In this aeration apparatus, it is preferable that each blade member is formed in a trapezoidal shape as viewed from above, an upper base part is supported by one of five planar parts that constitute the inner flow channel surface, and it is preferable that the injection nozzle injects the gas in the vertical direction as viewed from above, toward the planar part that supports the upper base part of the blade member disposed in the lowest stage. It is further preferable that the blade members are disposed such that intervals in a circumferential direction between the planar parts, which support the upper base parts in the respective stages, expand in a stepwise manner from lower stages toward higher stages.

Moreover, the aeration apparatus can further comprise a support that supports the main body and the injection nozzle when placed on a floor, and it is preferable that the support has a flow port below the main body, through which the liquid can pass.

Advantageous Effects of Invention

According to the present invention, an aeration apparatus that can break gas that has been released in a liquid into fine bubbles so as to uniformly disperse the gas, and efficiently agitate the liquid, can be provided.

DESCRIPTION OF EMBODIMENTS

Below, an embodiment of the present invention will now be described with reference to the attached drawings. FIGS.

Figure 1:
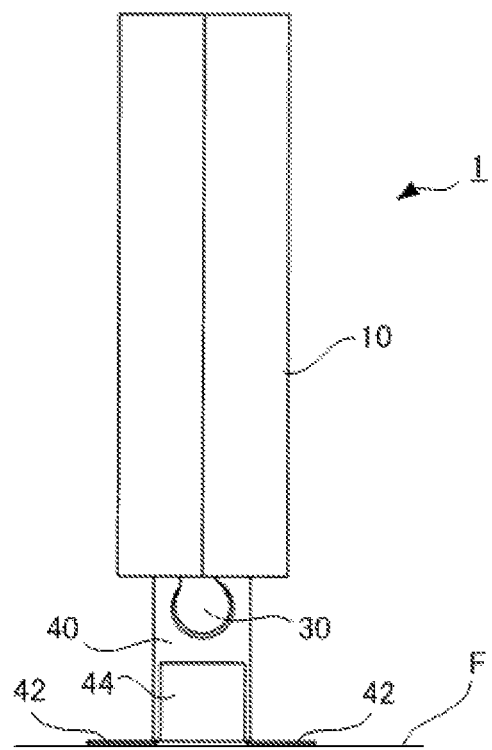
FIG. 1 is a front view of an aeration apparatus according to one embodiment of the present invention.
Figure 2:
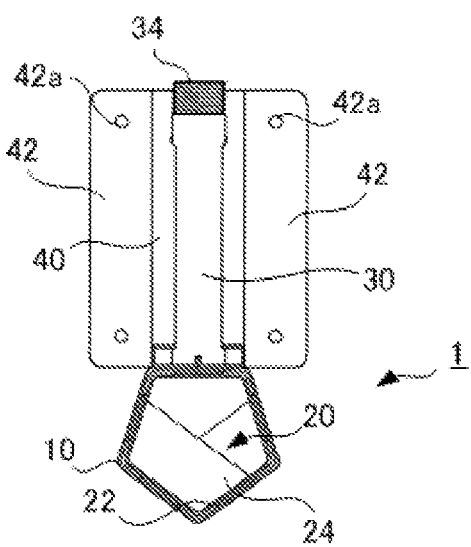
FIG. 2 is a plan view of the aeration apparatus.
Figure 3:
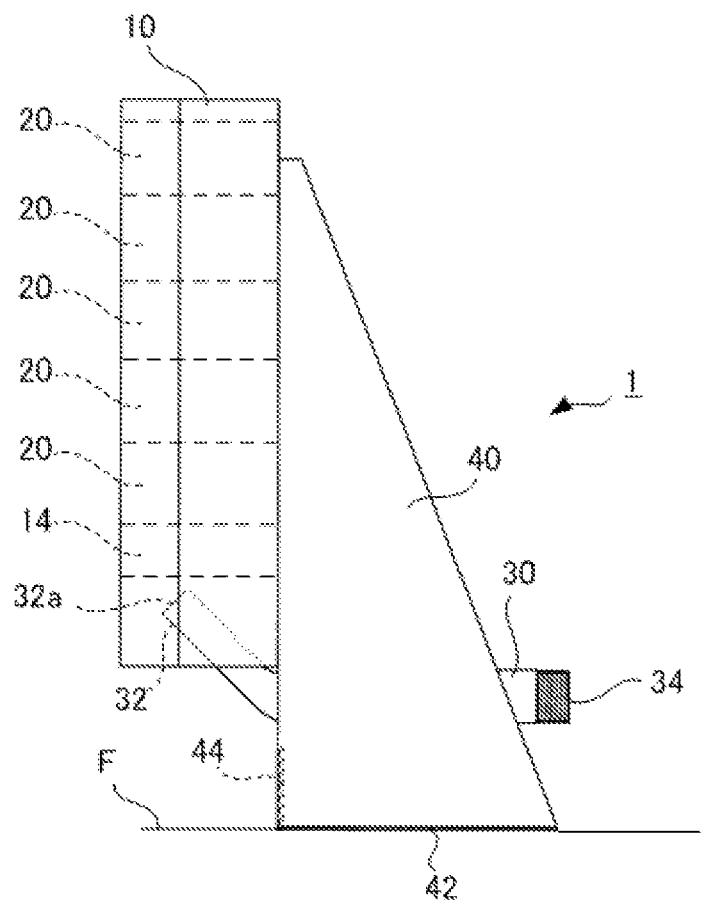
FIG. 3 is a side view of the aeration apparatus.

1 to 3 show an aeration apparatus according to one embodiment of the present invention, where FIG. 1 is a front view, FIG. 2 is a plan view, and FIG. 3 is a side view. As shown in FIGS. 1 to 3, an aeration apparatus 1 includes a cylindrical main body 10, a plurality of blade units 20 provided within the main body 10, an air pipe 30 provided in a lower area of the main body 10, and a support 40 that supports the main body 10 and the air pipe 30. The main body 10 has openings on both ends and is formed in a regular pentagonal shape as viewed from above, and can be formed of, for example, a rust-resistant metal material such as stainless steel, a water-resistant and corrosion-resistant plastic material such as engineering plastics, or the like.

Figure 4:
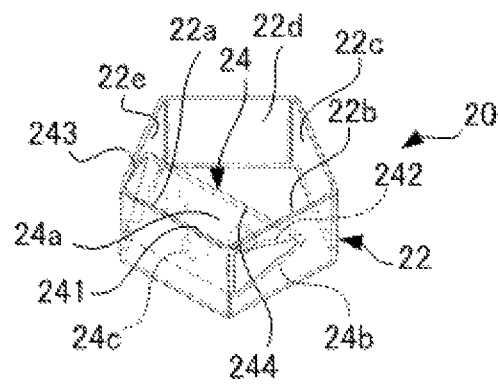
FIG. 4 is a perspective view of a blade unit provided in the aeration apparatus.

As shown in the perspective view in FIG. 4, each blade unit 20 includes a frame 22 and a blade member 24 supported by the frame 22. The frame 22 is formed in a regular pentagonal shape such that the entire outer peripheral surface tightly adheres to the inner peripheral surface of the main body 10, and the inner peripheral surface of the frame 22 is composed of five planar parts 22a, 22b, 22c, 22d, and 22e that are connected in series. The blade member 24 is formed in a trapezoidal shape as viewed from above, with an upper base part 241 being supported by the planar part 22a of the frame 22, and sloped side parts 242 and 243 being supported by other planar parts 22b and 22e, respectively, which are adjacent to the planar part 22a on both sides thereof. An upper surface 24a and a lower surface 24b of the blade member 24 are both configured as sloped surfaces such that the blade member 24 tapers from the upper base part 241 toward a lower base part 244 that serves to be a leading end side, and a plurality of projections 24c are provided on the lower surface 24b. Although the angle of slope of the upper surface 24a and the lower surface 24b relative to a horizontal plane is not particularly limited, it is preferable to set the angle of slope of the upper surface 24a at 20 to 40 degrees and the angle of slope of the lower surface 24b at 10 to 30 degrees, for example. Each blade unit 20 can be formed in an integrated manner from, for example, a resin material.

Figure 5:
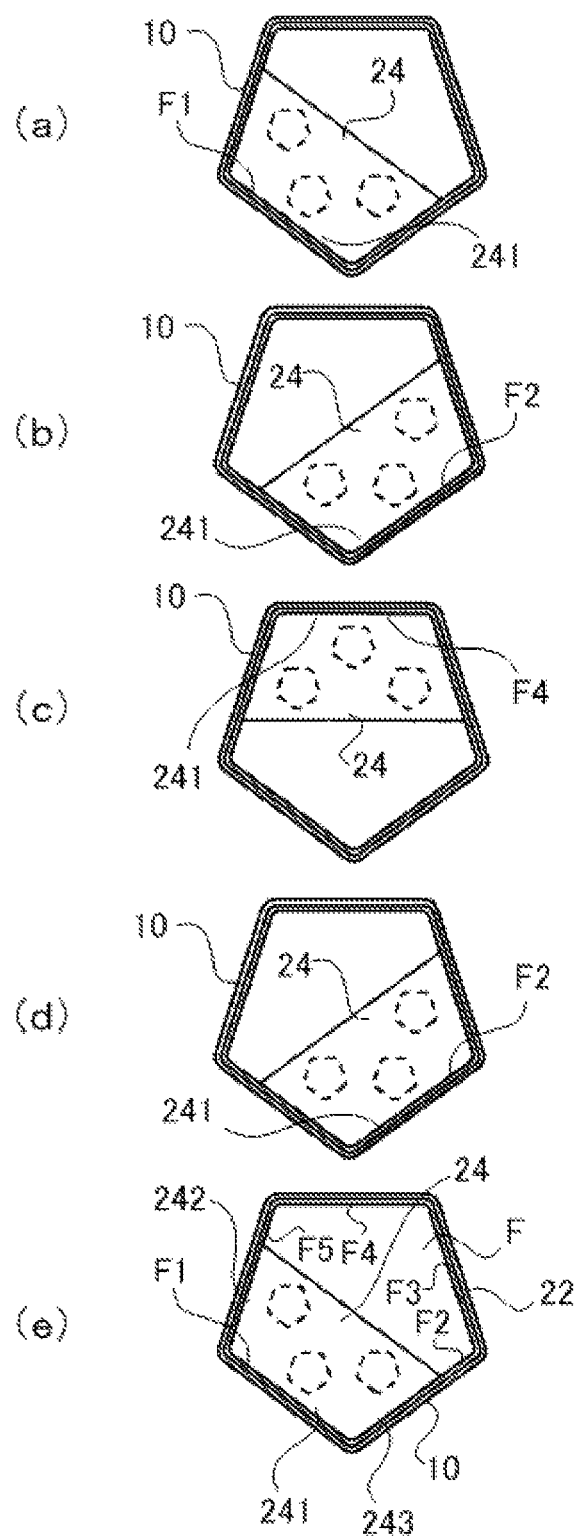
FIGS. 5(a) to 5(e) plan views of primary components for illustrating the arrangement of the blade unit in the aeration apparatus.

The plurality of blade units 20 having the above-described configuration are inserted into the main body 10 in multiple stages as indicated by the broken line in FIG. 3 such that the orientation of each blade member 24 is different. The plan view in FIG. 5 shows the orientation of the blade member 24 of each blade unit 20. In the present embodiment, five blade units 20 are provided, and FIGS. 5(a) to (e) show the blade units in order from the highest stage to the lowest stage. As shown in FIG. 5(e), the blade unit 20 constitutes a flow channel F for the main body 10 within the frame 22, and the inner peripheral surface of the frame 22 constitutes the inner flow channel surface that has a regular pentagonal cross-sectional shape and is formed by five planar parts F1, F2, F3, F4, and F5 connected consecutively in the counterclockwise order. As shown in FIG. 5(e), the blade unit 20 in the lowest stage is inserted into the main body 10 such that the planar part that supports the upper base part 241 of the blade member 24 (hereinafter referred to as a "support planar part") is the planar part F1.

As opposed to this, as shown in FIG. 5(d), the blade unit 20 in the second stage from the bottom is inserted into the main body 10 so as to have such an orientation that the planar part immediately next, in the counterclockwise direction, to the support planar part F1 of the blade unit 20 in the lowest stage serves as the support planar part, or in other words, in such an orientation that the support planar part is the planar part F2. As shown in FIG. 5(c), the blade unit 20 in the third stage from the bottom is inserted into the main body 10 so as to have such an orientation that the planar part at two places away, in the counterclockwise direction, from the support planar part F2 of the blade unit 20 in the second stage from the bottom is the support planar part, or in other words, in such an orientation that the support planar part is the planar part F4. Thus, the configuration is such that an interval, in a circumferential direction, between the support planar part of the blade unit 20 in a given stage aside from the lowest stage and the support planar part of the blade unit 20 one stage therebelow expands in a stepwise manner from the lower stages toward the higher stages. In other words, as shown in FIG. 5(b), the support planar part of the blade unit 20 in the fourth stage from the bottom is the planar part F2, which is at three places away from the planar part F4 in the counterclockwise direction, and, as shown in FIG. 5(a), the support planar part of the blade unit 20 in the highest stage is the planar part F1, which is at four places away from the planar part F2 in the counterclockwise direction.

Figure 6:
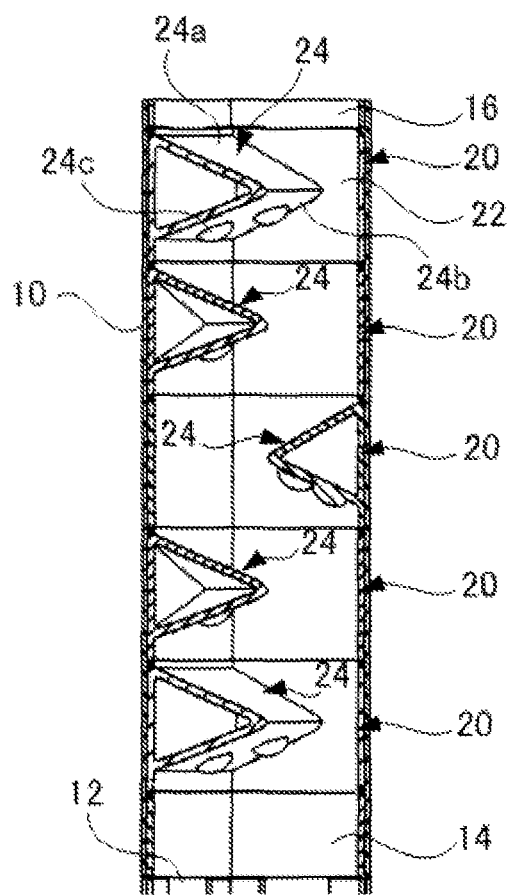
FIG. 6 is a vertical cross-sectional view of primary components of the aeration apparatus.

As shown in the vertical cross-sectional view of primary components in FIG. 6, an engagement part 12 that projects inward is provided on the lower inner peripheral surface of the main body 10, and the blade units 20 are inserted into the main body 10 after a regular pentagonal tube-shaped spacer 14 is first inserted and engaged with the engagement part 12. In this way, the blade units 20 are supported at predetermined vertical positions within the main body 10, and are then secured by an anchoring ring 16 that is eventually inserted into the main body 10. The inner surface of the spacer 14 is flush with the inner surface of the blade units 20 and constitutes a part of the inner flow channel surface of the main body 10.

As indicated by the broken line in FIG. 1, an injection nozzle 32 is formed at one end of the air pipe 30. The injection nozzle 32 is provided at the end of the lower opening in the main body 10, and an injection port 32a is formed in the tip of the injection nozzle 32. An attachment part 34 to which a hose (not shown) or the like can be attached is provided in the other end of the air pipe 30, and by connecting a gas supply source (not shown) such as a compressor, a blower, a gas tank, or the like, a gas such as air can be injected from the injection port 32a of the injection nozzle 32 into the flow channel within the main body 10.

Figure 7:
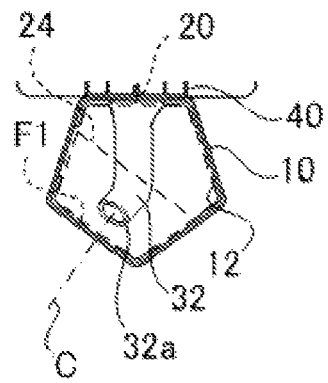
FIG. 7 is a plan view of primary components for illustrating the arrangement of an injection nozzle in the aeration apparatus.

As shown in the plan view of primary components in FIG. 7, the injection nozzle 32 is disposed such that a center line C of the injection port 32a extending in the normal direction of the open face is orthogonal, as viewed from above, to the planar part F1 that partially constitutes the inner flow channel surface of the main body 10, and is configured to inject the gas toward the center of the planar part F1 in the vertical direction as viewed from above. The planar part F1 is the support planar part of the blade unit 20 in the lowest stage as indicated by the broken line in FIG. 7. Moreover, as shown in the vertical cross-sectional view of primary components in FIG. 8, the injection nozzle 32 is disposed such that the center line C of the injection port 32a is disposed obliquely upward so as to intersect an inner flow channel surface S of the main body 10 at a position lower than the blade member 24 of the blade unit 20 disposed in the lowest stage. An angle θ formed between the center line C and the vertical direction taken along the inner flow channel surface S is set to be no greater than 45 degrees.

The support 40 can be formed by bending a thin plate of a metal such as stainless steel, and is provided with a pair of base members 42 and 42 formed by bending left and right lower portions of the support 40 as shown in FIGS. 1 to 3. The main body 10 and the air pipe 30 are supported between the pair of base members 42 and 42. Attachment holes 42a and 42a through which screws, anchor bolts, or the like can be passed are formed in the base members 42 and 42, and the base members 42 and 42 can be secured to a floor F with a suitable interval (for example, about 10 to 15 cm) between the lower end of the main body 10 in an upright state and the floor F. As shown in FIG. 1, a flow port 44 through which the liquid can flow is formed in the support 40, between the pair of base members 42 and 42 and below the lower end of the main body 10.

Next, operations of the aeration apparatus 1 having the above-described configuration will now be described. First, the aeration apparatus 1 is installed by placing the main body 10 upright in the vertical direction such that the injection nozzle 32 is on the lower side, in a reservoir tank or the like that holds a liquid to be treated, such as wastewater or sewage. Although the aeration apparatus 1 can be installed by securing the base members 42 of the support 40 to the floor F as described above, it is also possible that the main body 10 is suspended and supported from above, without using the support 40. Aerobic microorganisms, such as in activated sludge, may be mixed into the reservoir tank.

Then, with the main body 10 immersed in the liquid, compressed air or the like is supplied from the gas supply source (not shown) connected to the air pipe 30 and gas is injected from the injection nozzle 32 into the flow channel in the main body 10 and dispersed, and thus the liquid is drawn in from the lower end of the main body 10 and rises along with the injected gas due to the ejector effect. In the case where sludge or the like has accumulated on the floor F, the sludge or the like is agitated and mixed with the liquid, and is introduced into the main body 10.

Figure 8:
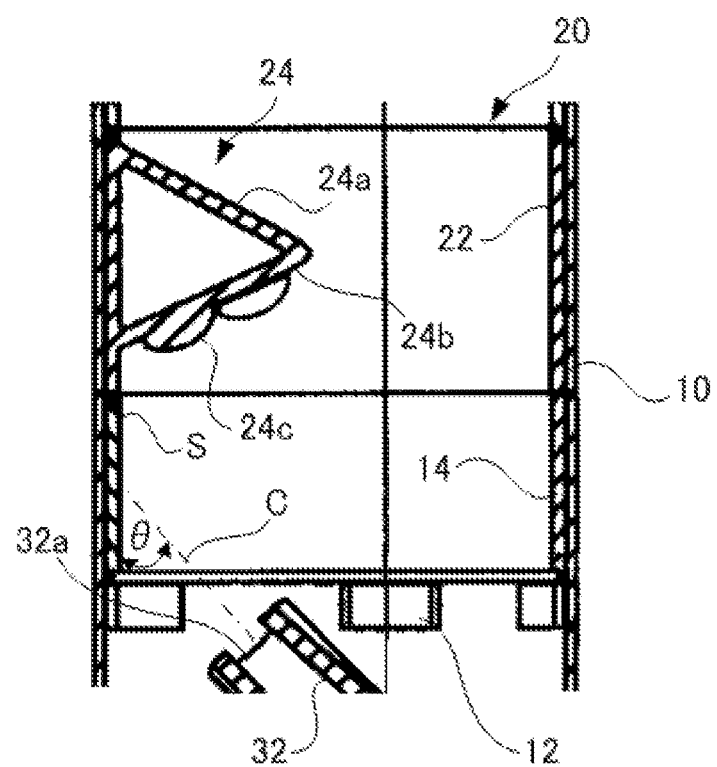
FIG. 8 is a vertical cross-sectional view of primary components for illustrating the arrangement of the injection nozzle in the aeration apparatus.

As shown in FIG. 8, the injection nozzle 32 is disposed such that the center line C of the injection port 32a intersects the inner flow channel surface S below the blade member 24 in the lowest stage, and furthermore, the angle θ formed with the vertical direction is set to be no greater than 45 degrees so that the injection nozzle 32 converges vertically upward. Accordingly, there is no possibility of the injected gas colliding with the lower surface 24b of the blade member 24 and bouncing downward, and a problem in that sufficient climbing power is not obtained due to the injection direction being close to horizontal does not occur. Therefore, the gas rises smoothly along the inner flow channel surface S to the blade member 24 in the lowest stage and, together with the liquid, sludge, and the like, collides with the lower surface 24b of the blade member 24 and is thus agitated and mixed. As a result, the drawing force and the agitation force exerted on the liquid, sludge, and the like by the injected gas can be improved. Although there is no particular lower limit value for the angle θ formed between the center line C and the vertical direction, an excessively low angle θ requires the spacer 14 to be tall, which results in overall bulkiness, and therefore the angle is preferably no less than 15 degrees and more preferably no less than 30 degrees, for example.

Furthermore, as shown in FIG. 7, the injection nozzle 32 injects the gas toward the planar part F1 of the inner flow channel surface in the vertical direction as viewed from above, and thus this configuration can also prompt the gas to rise smoothly along the inner flow channel surface S, which can increase the aforementioned effects.

In the flow channel within the main body 10, the plurality of blade members 24 are provided in multiple stages so as to have different orientations, and thus the liquid with which gas, sludge, or the like is mixed rises while swirling in the horizontal direction and the vertical direction among the blade members 24 in the respective stages, and is ejected from the top end of the main body 10. In this way, the liquid circulates within the reservoir tank while the gas, sludge, or the like mixed therewith is agitated and finely broken up. The dissolved oxygen content within the liquid is increased by the air and liquid effectively circulating within the reservoir tank. In the case where aerobic microorganisms such as in activated sludge or the like are intermixed in the reservoir tank, the increased dissolved oxygen content increases the activity of the microorganisms, which in turn accelerates the breakdown of organic matter in the liquid by the microorganisms, and this cleans the inside of the reservoir tank.

In particular, in the present embodiment, the blade members 24 are disposed in the respective stages such that the intervals in the circumferential direction between the planar parts F1 to F5, which support the upper base parts 241 of the blade members 24, expand in a stepwise manner from the lower stages toward the higher stages (see FIG. 5). Accordingly, the swirling direction of the liquid that has been drawn-in in the counterclockwise direction from the lower end of the main body 10 as viewed from above inverts as the liquid rises vigorously within the main body 10 due to the injection from the injection nozzle 32 (based on experiments performed by the inventors of the present invention, in the case where five stages of blade members 24 are provided, the swirling direction of the liquid inverts between the fourth and fifth stages) and becomes clockwise as viewed from above, and the liquid is then ejected from the top end of the main body 10. The gas, sludge, or the like is prompted to finely break up and become agitated by this inverting action, which makes it possible to perform the cleaning in an efficient manner. As in the present embodiment, it is preferable that the plurality of projections 24c are provided on the lower surfaces 24b of the blade members 24, which makes it easier to produce turbulent mixing of the gas and liquid.

Furthermore, the support 40 has the flow port 44 through which the liquid can pass below the main body 10, and thus sludge or the like that has accumulated between the pair of base members 42 and 42 is drawn into the main body 10 through the flow port 44 along with the liquid. As described above, the aeration apparatus 1 according to the present embodiment improves the force of drawing the liquid, and thus there is no possibility of insufficient drawing force on the liquid even if the flow port 44 is formed, and more effective cleaning is possible.

One embodiment of the present invention has been described above in detail, but the specific form of the present invention is not limited to the foregoing embodiment. For example, while the foregoing embodiment employs a configuration in which the blade units 20 including the blade members 24 are provided in multiple stages to thus form the inner flow channel surface of the main body 10 by the inner peripheral surfaces of the frames 22 and provide the blade members 24 on this inner flow channel surface, it is also possible to configure the inner peripheral surface of the main body 10 to be the inner flow channel surface by attaching the blade members 24 directly to the inner peripheral surface of the main body 10.

REFERENCE SIGNS LIST

1 Aeration apparatus
10 Main body
20 Blade unit
24 Blade member
241 Upper base part 30 Air pipe
32 Injection nozzle
32a Injection port
40 Support
44 Flow port
C Center line
F1-F5 Planar part

The invention claimed is:

1. An aeration apparatus comprising:
    a main body in a shape of a cylinder with open ends;
    a plurality of blade units within the main body; and
    an injection nozzle at one of the open ends of the main body,
    wherein the injection nozzle is configured to be immersed in a liquid with the main body standing upright such that the injection nozzle is on a lower side, and the injection nozzle is further configured to inject gas inside the main body to disperse the gas;
    wherein each of the plurality of blade units includes a frame and a blade member supported by the frame, the frame having a pentagonal shape;
    wherein an inner peripheral surface of the frame constitutes an inner flow channel surface having a pentagonal cross-sectional shape;
    wherein the plurality of blade units are inserted into the main body in multiple stages such that an orientation of each of the plurality of blade units is different;
    wherein the injection nozzle is configured such that a center line of an injection port at a tip of the injection nozzle intersects the inner flow channel surface at a position lower than a blade unit, from among the plurality of blade units at a lowest one of the multiple stages, and such that an angle between the center line and a vertical direction is less than or equal to 45 degrees;
    wherein the aeration apparatus further includes a pentagonal tube-shaped spacer entirely above the injection nozzle and below the blade unit at the lowest one of the multiple stages in the main body; and
    wherein an inner surface of the pentagonal tube-shaped spacer is flush with an inner surface of the plurality of blade units and constitutes a part of the inner flow channel surface.

2. The aeration apparatus according to claim 1, wherein
    each of the plurality of blade units has a trapezoidal shape as viewed from above, and an upper base part is supported by a planar part from among a plurality of planar parts that constitute the inner flow channel surface; and
    the injection nozzle is further configured to inject the gas in the vertical direction, as viewed from above, toward the planar part that supports the upper base part of the blade unit at the lowest one of the multiple stages.

3. The aeration apparatus according to claim 2, wherein the plurality of blade units are configured such that intervals in a circumferential direction between the planar parts, which support the upper base parts in respective ones of the multiple stages, expand in a stepwise manner from the lowest one of the multiple stages toward higher ones of the multiple stages.

4. The aeration apparatus according to claim 1, further comprising:
    a support configured to support the main body and the injection nozzle when placed on a floor, wherein
        the support has a flow port below the main body, the flow port being configured to pass the liquid there through.

* * * * *